United States Patent [19]
Cooley

[11] 3,836,869
[45] Sept. 17, 1974

[54] LASER GLASS HOST COMPOSITIONS COMPRISING $TeO_2$, BaO AND ZnO AND METHODS OF MAKING AND USING THE SAME

[75] Inventor: Richard F. Cooley, Toledo, Ohio

[73] Assignee: Owens-Illinois, Inc., Toledo, Ohio

[22] Filed: June 27, 1973

[21] Appl. No.: 373,906

[52] U.S. Cl. .............................. 331/94.5, 252/301.4
[51] Int. Cl. .............................................. H01s 3/16
[58] Field of Search ........ 252/301.4, 301.6; 106/47; 331/94.5

[56] References Cited
UNITED STATES PATENTS
3,462,707 8/1969 Pearson et al. .................... 331/94.5

*Primary Examiner*—William L. Sikes
*Attorney, Agent, or Firm*—Richard D. Heberling; E. J. Holler

[57] ABSTRACT

Laser glass host compositions for effective lasing amounts of $Nd_2O_3$ are disclosed, the host compositions comprising $TeO_2$, BaO and ZnO in certain molar amounts. Methods of making highly effective laser articles, including laser rods, also are disclosed. The new use of the above-described $TeO_2$/BaO/ZnO glass compositions for forming laser articles are disclosed, the new use including forming laser articles from the glasses, pumping the laser articles to provide an energy inversion, and lasing the pumped articles.

19 Claims, 2 Drawing Figures

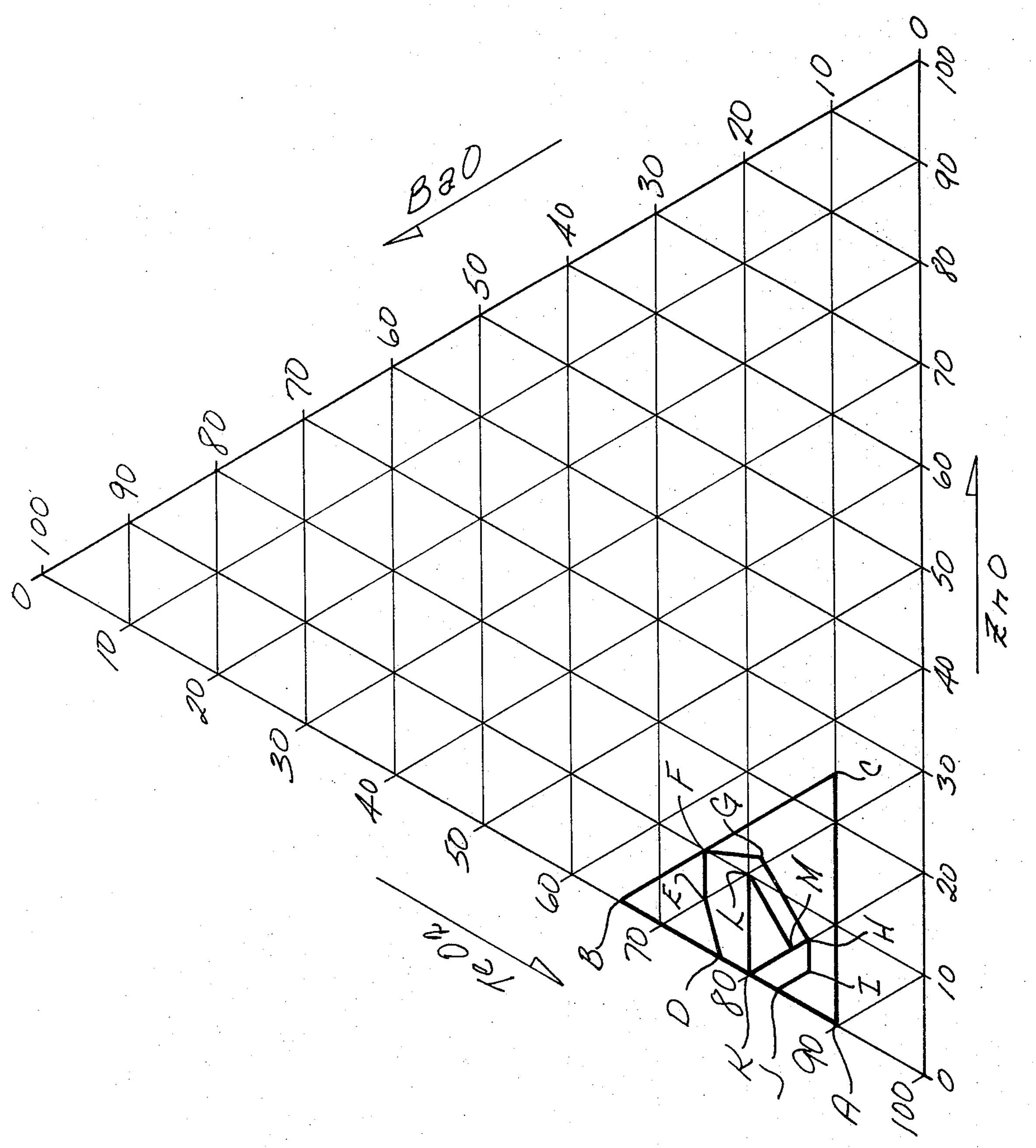
BaO
ZnO
TeO2
A
B
C
D
E
F
G
H
I
J
K
L
M

LASER GLASS HOST COMPOSITIONS COMPRISING $TeO_2$, BaO AND ZnO AND METHODS OF MAKING AND USING THE SAME

INVENTION

The present invention relates to glass host compositions for efficient laser articles, the host compositions comprising $TeO_2$, BaO and ZnO in certain molar amounts and containing effective lasing amounts of $Nd_2O_3$. The present invention also relates to methods of making laser articles with increased efficiency, the methods including melting laser glass batch-forming materials to provide a molten $TeO_2$/BaO/ZnO glass containing an effective lasing amount of $Nd_2O_3$; forming a glass laser blank from the molten glass; and fabricating a glass laser article from the blank.

The present invention also relates to the new use for $TeO_2$/BaO/Zno glass compositions for laser articles, the new use including forming the laser articles from the glass compositions that also contain an effective lasing amount of $Nd_2O_3$; pumping the laser article; and lasing the pumped article.

It is desirable to provide laser glass compositions that can be used to make outstanding, highly efficient glass laser articles. It is also desirable to provide novel methods for making the same and to provide the new use for glass compositions comprising $TeO_2$, BaO and ZnO, in which the new use includes the steps of:

1. forming a glass laser article from the glass composition that is a host for an effective lasing amount of $Nd_2O_3$;
2. pumping the laser article; and thereafter
3. lasing the pumped article.

It is an object of the present invention to provide a laser glass composition containing $TeO_2$, BaO and ZnO in which the molar proportions of $TeO_2$, BaO and ZnO are defined by the area within the heavy lines connecting the points ABC of the ternary diagram of the FIGURE of the drawings, the glass composition being a host for an effective lasing amount of $Nd_2O_3$.

It is an object of the present invention to provide a method for making a glass article, such as a laser rod, in which the method comprises the steps of:

1. melting laser glass batch-forming materials to provide a molten glass comprising $TeO_2$, BaO and ZnO in which the molar proportions thereof are defined by the area within the heavy lines connecting points ABC of the ternary diagram of the FIGURE, the molten glass being a host for an effective lasing amount of $Nd_2O_3$;
2. forming a glass laser blank from the molten glass; and
3. fabricating a laser article from the blank to provide a very efficient laser article.

It is an object of the present invention to provide the new use for a glass composition as a glass laser article in which the glass contains certain molar proportions of $TeO_2$, BaO and ZnO that are defined by the area within the heavy lines connecting points ABC of the ternary diagram, and in which the glass composition is a host for an effective lasing amount of $Nd_2O_3$, the new use comprising the steps of:

1. forming a glass laser article from the glass composition comprising $TeO_2$, BaO and ZnO;
2. pumping the laser article to provide an energy inversion; and
3. lasing the pumped laser article.

It is an object of the present invention to provide highly efficient glass laser articles, such as rods or discs, made from a glass composition comprising certain molar amounts of $TeO_2$, BaO and ZnO, the composition being a host for an effective lasing amount of $Nd_2O_3$.

These and other objects will become apparent from the specification that follows, the appended claims and the drawings, in which the FIGURE is a ternary diagram of the glass host composition of the present invention in which the molar proportions of $TeO_2$, BaO and ZnO are defined by the areas within the heavy lines of the ternary diagram.

The present invention provides outstanding laser glass host compositions for effective lasing amounts of $Nd_2O_3$, the host compositions comprising $TeO_2$, BaO and ZnO in certain molar proportions thereof that are defined in a general range by the area within the heavy lines connecting the points ABC of the ternary diagram of the FIGURE of the drawing. Preferably, the molar proportions of $TeO_2$, BaO and ZnO are defined by the area within the heavy lines, connecting the points DEFGHIJ in the ternary diagram. The optimum laser glass host compositions of the present invention contain molar amounts of $TeO_2$, BaO and ZnO that are defined in an optimum range by the area within the heavy lines connecting the points KLM in the ternary diagram.

The present invention also provides methods for making highly efficient glass laser articles, the methods including the steps of:

1. melting laser glass batch-forming materials to provide a molten glass comprising $TeO_2$, BaO and ZnO in which the molar proportions thereof are defined in a general range by the area within the heavy lines connecting the points ABC of the ternary diagram, the molten glass capable of acting as a host for an effective lasing amount of $Nd_2O_3$;
2. forming a glass laser blank from the molten glass; and
3. fabricating the outstanding laser articles from the laser blank.

The present invention also provides the new use for a glass composition as a glass laser article in which the glass comprises $TeO_2$, BaO and ZnO in certain molar proportions that are defined in a general range within the area formed by the heavy lines connecting points ABC of the ternary diagram, and in which the glass composition is a host for an effective lasing amount of $Nd_2O_3$, the new use comprising the steps of:

1. forming a glass laser article from the glass composition comprising $TeO_2$, BaO and ZnO;
2. pumping the laser article to provide an energy inversion; and
3. passing monochromatic light through the article to provide a stimulated emission at a wavelength of about 1.06 microns.

A zinc tellurite glass consisting essentially of a major molar proportion of $TeO_2$ and between about 20 and 40 mole percent of ZnO is described and claimed in the Redman U.S. Pat. No. 3,423,326. These zinc tellurite glasses were reported as having some fluorescent activity when doped with $Nd_2O_3$.

As previously indicated, the outstanding laser glass host compositions of the present invention surprisingly exhibit much higher fluorescent activity than the zinc tellurite glasses of U.S. Pat. No. 3,423,326, the increased fluorescent activity indicating a greater lasing efficiency for laser articles made from the host compositions of the present invention. As previously described, only certain molar proportions of $TeO_2$, BaO and ZnO can be used to provide the highly efficient laser articles, such as rods and discs. The increase in fluorescent activity, when compared to the working examples of U.S. Pat. No. 3,423,326, is generally at least about 50% and preferably at least about 60 or 70%.

In the previously mentioned Redman U.S. Pat. No. 3,423,326, there is no mention of any glass system other than that of a glass host composition consisting essentially of tellurium oxide and zinc oxide. There is no suggestion in the previously mentioned Redman patent that highly efficient laser articles can be made from a host composition containing certain molar proportions of $TeO_2$, BaO and ZnO.

In general, the glass host compositions contain about 63–90 mole percent $TeO_2$, about 10–33 mole percent BaO, and about 0.2–25 mole percent ZnO.

Preferably, the laser glass host compositions of the present invention comprise about 65–83 mole percent $TeO_2$, about 13–25 mole percent BaO, and about 0.2–12 mole percent ZnO. The most preferred glass host compositions comprise about 70–80 mole percent $TeO_2$, 0.2–10 mole percent ZnO, and about 15–20 mole percent BaO.

Excellent laser glass host compositions are those comprising 70 mole percent $TeO_2$, 20 mole percent BaO and 10 mole percent ZnO; about 65 mole percent $TeO_2$, about 34.8 mole percent BaO and about 0.2 mole percent ZnO; or about 89.8 mole percent $TeO_2$, about 10 mole percent BaO and about 0.2 mole percent ZnO.

In accordance with the present invention, the increase in fluorescent activity for laser articles of the present invention is surprisingly at least about 50% over that of a zinc tellurite glass containing 65 mole percent $TeO_2$ and 35 mole percent ZnO.

The increase in fluorescent activity unexpectedly is at least about 50% greater than that of a lithia-calcia-alumino silicate glass laser rod as set forth in U.S. Pat. No. 3,471,409, to Lee and Rapp, the laser composition containing the following ingredients in approximate mole percentages:

| Ingredient | Mole Percent |
|---|---|
| $SiO_2$ | 60 |
| $Al_2O_3$ | 2.5 |
| $Li_2O$ | 27.5 |
| CaO | 10 |
| $Nd_2O_3$ | 0.5 |

The highest fluorescent intensity value for a zinc tellurite glass containing 35 mole percent ZnO is about 2.09 when compared to the fluorescent intensity value of the above described lithia-calcia-alumino silicate glass laser, which is the reference glass arbitrarily designated to be 1.0.

The following examples are intended to illustrate the present invention and not to limit the same in any way.

EXAMPLE 1

PART A

A 15 gram melt was prepared by mixing reagent grade raw materials, in the following molar percent and also for convenience, weight percent, with 30 ml. of water.

| Ingredients | Mole Percent | | Weight Percent | |
|---|---|---|---|---|
| | Host Glass | Laser Article | Host Glass | Laser Article |
| $TeO_2$ | 80.0 | 79.5 | 82.6 | 81.2 |
| ZnO | 5.0 | 4.9 | 2.6 | 2.5 |
| BaO | 15.0 | 14.8 | 14.8 | 14.6 |
| $Nd_2O_3$ | | 0.8 | | 1.7 |

The slurry was mixed for 10 minutes and poured into a gold crucible. The crucible was placed in an air circulating oven with the temperature maintained at 110° C. overnight to remove the water. The crucible was then placed in an electric resistance furnace with the temperature at 750° C. for 3 hours, or until homogenous, after which the molten glass immediately poured into a preheated (260° C.) graphite mold forming a disc having an 11/16 inch diameter and ¼ inch thickness. The graphite mold was placed in an annealing oven maintained at 340° C. After 1 hour, at 340° C., the temperature of the annealing oven was lowered at a rate of 38° C. per hour to 250° C., after which the annealing oven was turned off and the mold cooled to room temperature.

The solid, annealed glass disc was removed from the mold, wet ground and polished with close tolerance to a thickness of 0.195 inch and a diameter of 0.687 inch. The refractive index of the finished polished glass disc was measured to be 2.10.

PART B

The polished glass disc from Part A was tested for fluorescence intensity and decay time in a high power pulsed test system. The disc was placed in a holder and exposed to a beam of light from an EG & G model FX 12–25 xenon flash lamp. The flash lamp had a flash duration of about 20 microseconds. The disc was not observed to solarize after repeated excitation by the flash lamp. The fluorescence intensity and decay time of the excited sample was measured by photographing the oscilloscope display of the 1060 nanometer fluorescent intensity versus time on a Tektronix Model 556, Dual Trace oscilloscope connected to an RCA S-1 photomultiplier, having a narrow band pass filter.

The fluorescence intensity measurement was normalized against ED-2, a glass laser composition of Owens-Illinois, Inc., comprising, in mole percent, 60.0% $SiO_2$, 2.5% $Al_2O_3$, 27.5% $Li_2O$, 10% CaO, 0.16% $CeO_2$ and 0.5% $Nd_2O_3$, disclosed in U.S. Pat. No. 3,471,409, as Example 1. The fluorescence intensity was found to be 3.42 when normalized against the glass laser composition; 3.42 times the intensity of the glass laser composition.

The fluorescence intensity was corrected for the refractive indices of the glass disc and the reference glass laser composition by:

FI (corrected) = FI (normalized) [(1.56)$^2$/($\eta$ glass disc)$^2$]

The corrected fluorescence intensity was 1.84. The fluorescence decay time was 145 microseconds.

EXAMPLE 2

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 65.0 | 64.4 | 69.1 | 68.0 |
| ZnO | 10.0 | 9.9 | 5.4 | 5.3 |
| BaO | 25.0 | 24.8 | 25.5 | 25.0 |
| $Nd_2O_3$ | | 0.8 | | 1.7 |

The refractive index of the finished polished glass disc was measured to be 2.06.

PART B

The polished glass disc from Part A was tested for fluorescence intensity and decay time as described in Part B of Example 1. The normalized fluorescence intensity was 2.93, and the corrected fluorescence intensity was 1.49. The fluorescence decay time was 165 microseconds.

EXAMPLE 3

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 70.0 | 69.6 | 74.3 | 73.0 |
| ZnO | 10.0 | 9.9 | 5.4 | 5.3 |
| BaO | 20.0 | 19.8 | 20.3 | 20.0 |
| $Nd_2O_3$ | | 0.8 | | 1.7 |

The refractive index of the finished polished glass disc was measured to be 2.06.

PART B

The polished glass disc from Part A was tested for fluorescence intensity and decay time as described in Part B of Example 1. The normalized fluorescence intensity was 3.44 and the corrected fluorescence intensity was 1.92. The fluorescence decay time was 174 microseconds.

Other specific glass laser compositions set forth herein as being suitable for use in the present invention can be substituted for the specific glass laser compositions used in the working examples to provide substantially equivalent results. For instance, any of the compositions set forth within the area formed by the heavy lines connecting the points ABC of the ternary diagram, can be used in place of the specific laser compositions used in the working examples to provide an increased efficiency of at least about 50%. Preferably, the glass compositions set forth within the area formed by the heavy lines connecting the points DEFGHIJ provide an increased lasing efficiency of at least 50% and preferably 60 to 70% or more. Sometimes the increase in efficiency is as high as about 100% or more, as previously indicated, particularly when compared to the working examples of the Redman U.S. Pat. No. 3,423,326.

What is claimed is:

1. A laser glass composition comprising $TeO_2$, BaO and ZnO in which the proportions in molar amounts of $TeO_2$, BaO and ZnO are defined by the area within the heavy lines connecting the points ABC in the ternary diagram of the FIGURE, the laser glass composition including an effective lasing amount of $Nd_2O_3$.

2. A laser glass composition as defined in claim 1 in which the proportions of $TeO_2$, BaO and ZnO are within the area formed by the lines connecting the points DEFGHIJ in the ternary diagram of the FIGURE of the drawings.

3. A laser glass composition as defined in claim 1 in which the proportions of $TeO_2$, BaO and ZnO are within the area formed by the lines connecting the points KLM in the ternary diagram of the FIGURE of the drawings.

4. A laser glass composition comprising:

1. a host glass containing about 63–90 mole percent $TeO_2$, about 10–33 mole percent BaO, and about 0.2–25 mole percent ZnO; and
2. an effective lasing amount of $Nd_2O_3$.

5. A laser glass composition comprising:

1. a host glass containing about 65–83 mole percent $TeO_2$, about 13–25 mole percent BaO, and about 0.2–12 mole percent ZnO; and
2. an effective lasing amount of $Nd_2O_3$.

6. A laser glass host composition comprising about 70–80 mole percent $TeO_2$, 0.2–10 mole percent ZnO, and about 15–20 mole percent BaO, the host composition containing about 0.01–1.5 mole percent $Nd_2O_3$.

7. A laser glass composition as defined in claim 4 in which the host glass comprises about 70 mole percent $TeO_2$, 20 mole percent BaO and 10 mole percent ZnO.

8. A laser glass composition as defined in claim 4 in which the glass host comprises about 80 mole percent $TeO_2$, 19.8 mole percent BaO and 0.2 mole percent ZnO.

9. A laser glass composition as defined in claim 4 in which the glass host comprises about 83 mole percent $TeO_2$, 13 mole percent BaO and 4 mole percent ZnO.

10. A laser glass composition as defined in claim 3 in which the glass host comprises about 65 mole percent $TeO_2$, about 10 mole percent BaO and about 25 mole percent ZnO.

11. A laser glass composition as defined in claim 3 in which the glass host comprises about 65 mole percent $TeO_2$, about 34.8 mole percent BaO and about 0.2 mole percent ZnO.

12. A laser glass composition as defined in claim 3 in which the glass host comprises about 89.8 mole percent $TeO_2$, about 10 mole percent BaO and about 0.2 mole percent ZnO.

13. A method for making a glass laser article such as a rod, disc and the like, the method comprising the steps of:

1. melting laser glass batch-forming materials to provide a molten glass comprising $TeO_2$, BaO and ZnO in which the proportions thereof are defined by the area within the heavy lines connecting the points ABC in the ternary diagram of the FIGURE of the drawings, and an effective lasing amount of $Nd_2O_3$; and
2. forming a laser article from the molten glass, the article having increased lasing efficiency.

14. A method as defined in claim 13 in which the glass comprising $TeO_2$, BaO and ZnO has amounts thereof defined by the area within the heavy lines connecting the points DEFGHIJ of the ternary diagram of the FIGURE of the drawings.

15. The new use for a $TeO_2$/BaO/ZnO glass composition as a glass laser article in which the proportions of $TeO_2$, BaO and ZnO are defined by the area within the heavy lines connecting the points ABC in the ternary diagram in the FIGURE of the drawing and which glass composition is a host for an effective lasing amount of $Nd_2O_3$, the new use comprising the steps of:

1. forming the glass laser article;
2. pumping the laser article to provide an energy inversion; and
3. lasing the pumped laser article.

16. A glass laser article made from the composition defined in claim 1.

17. A glass laser article made from the composition defined in claim 1, in the form of a rod.

18. A glass laser article made from the composition defined in claim 1, in the form of a disc.

19. A glass laser article made according to the method defined in claim 13.

* * * * *